United States Patent
Shin

(10) Patent No.: US 6,741,550 B1
(45) Date of Patent: May 25, 2004

(54) METHOD OF ALLOCATING OPTIMUM WALSH CODES TO REVERSE LINK

(75) Inventor: Hong Sup Shin, Seoul (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/223,735

(22) Filed: Dec. 31, 1998

(30) Foreign Application Priority Data

Jun. 16, 1998  (KR) .......................................... 98-22457

(51) Int. Cl.⁷ ................................................ H04J 11/00
(52) U.S. Cl. ....................... 370/209; 370/335
(58) Field of Search ................................ 370/203, 208, 370/209, 329, 335, 441, 479, 342; 379/130, 139, 140

(56) References Cited

U.S. PATENT DOCUMENTS

| | | | | |
|---|---|---|---|---|
| 5,515,378 A | * | 5/1996 | Roy et al. .................... 370/334 |
| 5,812,938 A | * | 9/1998 | Gilhousen et al. ............ 455/69 |
| 5,943,329 A | * | 8/1999 | Ohgoshi et al. ............ 370/335 |
| 5,983,118 A | * | 11/1999 | Lee ............................. 455/562 |
| 6,005,848 A | * | 12/1999 | Grube et al. ................ 370/266 |
| 6,023,462 A | * | 2/2000 | Nieczyporowicz et al. . 370/335 |
| 6,069,883 A | * | 5/2000 | Ejzak et al. ................. 370/335 |
| 6,137,786 A | * | 10/2000 | Ariyoshi et al. ............ 370/335 |
| 6,175,587 B1 | * | 1/2001 | Madhow et al. ............ 375/148 |
| 6,185,246 B1 | * | 2/2001 | Gilhousen .................... 370/200 |
| 6,188,678 B1 | * | 2/2001 | Prescott ....................... 370/318 |
| 6,192,042 B1 | * | 2/2001 | Seo ............................. 370/342 |
| 6,473,395 B1 | | 10/2002 | Lee |

FOREIGN PATENT DOCUMENTS

EP    0818892 A3    1/1998

* cited by examiner

Primary Examiner—Dang Ton
Assistant Examiner—Phuc Tran
(74) Attorney, Agent, or Firm—Fleshner & Kim, LLP

(57) ABSTRACT

A method of allocating optimum orthogonal function codes to a reverse link in a communication system which has one base station and a plurality of mobile stations, comprising the first step of detecting characteristics of reverse channels from a desired one of the mobile stations to the base station, the second step of obtaining an orthogonal function code based on the detected characteristics of the reverse channels, and the third step of allocating the obtained orthogonal function code to the desired mobile station. According to the present invention, optimum Walsh codes are allocated for distinction between mobile station signals of the reverse link to minimize an interference between mobile stations in a CDMA communication system. Therefore, an inter-mobile station interference through a multipath can be minimized to significantly enhance a signal-to-noise ratio of the reverse link.

30 Claims, 3 Drawing Sheets

METHOD OF ALLOCATING OPTIMUM WALSH CODES TO REVERSE LINK

BACKGROUND OF THE INVENTION

1. Field of the Invention

The present invention relates in general to a method of allocating optimum Walsh codes for distinction between mobile station signals of a reverse link to minimize an interference between mobile stations in a code division multiple access (referred to hereinafter as CDMA) communication system.

2. Description of the Prior Art

In a CDMA communication system, generally, a reverse link from mobile stations to a base station is inferior in speech quality to a forward link from the base station to the mobile stations. In particular, a multipath fading and inter-mobile station interference on the reverse link exert an important effect on performance of the communication system.

In the forward link, all CDMA signals are distinguished from one another according to pseudo noise (referred to hereinafter as PN) codes. Also, all the CDMA signals share a pair of quadrature PN codes.

Namely, all CDMA signals, which are transmitted from one base station over CDMA channels, have the same PN code phase. These signals are distinguished from one another by mobile stations according to binary orthogonal codes based on a Walsh function.

However, there is now present no method capable of minimizing a multipath fading and inter-user interference in transmission and reception of the reverse link. Instead, there has merely been proposed a method for spreading the PN codes in the forward link.

FIG. 1 is a block diagram illustrating code spreading in a conventional reverse link.

In the conventional reverse link, as shown in FIG. 1, each mobile station signal is spread by a long PN code 1 and short PN code 2. As a result, the mobile station signals are discriminated therebetween on the basis of the long PN codes 1 allocated respectively to the corresponding mobile stations, and spread in I and Q channels by the short PN code 2.

In this manner, in the conventional reverse link, the mobile stations are equalized in interference therebetween and minimized in performance difference therebetween.

Noticeably, the degree of interference is proportional to the number of mobile stations. For this reason, the maximum number of mobile stations accommodatable by one base station is subjected to a limitation due to multipath characteristics of the mobile stations and degree of interference between the mobile stations.

The above-mentioned conventional reverse link has the following disadvantage.

Namely, in the reverse link, signals which the base station receives from the mobile stations are not in synchronization with one another under the real condition that any synchronization system is not considered. This makes it difficult to enhance a signal-to-noise ratio of the reverse link.

SUMMARY OF THE INVENTION

Therefore, the present invention has been made in view of the above problem, and it is an object of the present invention to provide a method of allocating optimum Walsh codes to a reverse link, in which a synchronization system is presented to mobile station signals in the reverse link, and the optimum Walsh codes are obtained to minimize an interference among a plurality of mobile stations and then allocated respectively to the mobile stations to spread the mobile station signals through the reverse link, so that the reverse link can significantly be enhanced in signal-to-noise ratio.

In accordance with one aspect of the present invention, there is provided a method of allocating optimum orthogonal function codes to a reverse link in a communication system which have one base station and a plurality of mobile stations, comprising the first step of detecting characteristics of reverse link channels from a desired one of the mobile stations to the base station; the second step of obtaining an orthogonal function code based on the detected characteristics of the reverse link channels; and the third step of allocating the obtained orthogonal function code to the desired mobile station.

In a feature of the present invention, in addition to conventional PN codes, optimum Walsh codes are allocated for distinction between mobile station signals to minimize an interference between mobile stations of a reverse link, thereby significantly enhancing a signal-to-noise ratio of the reverse link. The optimum Walsh codes are obtained on the basis of cross correlation.

In accordance with another aspect of the present invention, there is provided a method of allocating optimum Walsh codes to a reverse link in a mobile communication system which have a plurality of service areas, each of the service areas including one base station and a plurality of mobile stations, comprising the step of sequentially allocating Walsh codes respectively to the mobile stations in each of the service areas to distinguish signals from transmitted from the mobile stations from one another.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
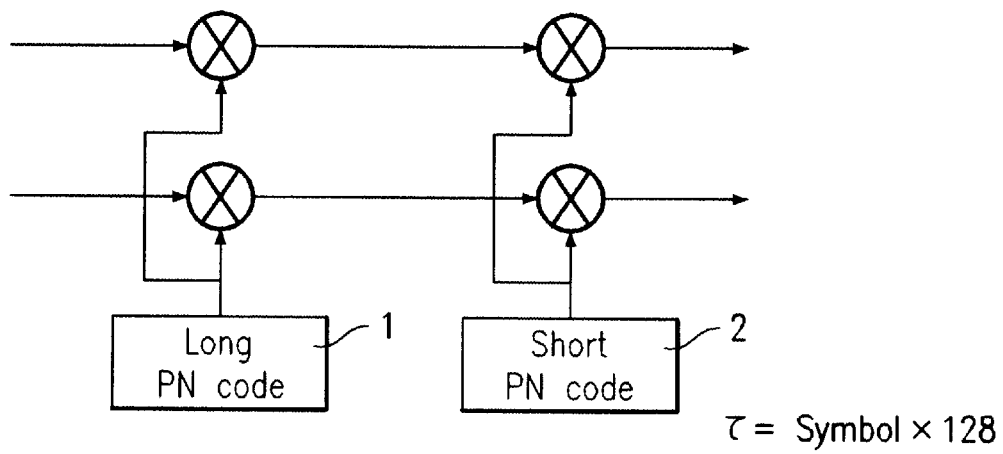
FIG. 1 is a block diagram illustrating code spreading in a conventional reverse link.
Figure 2:
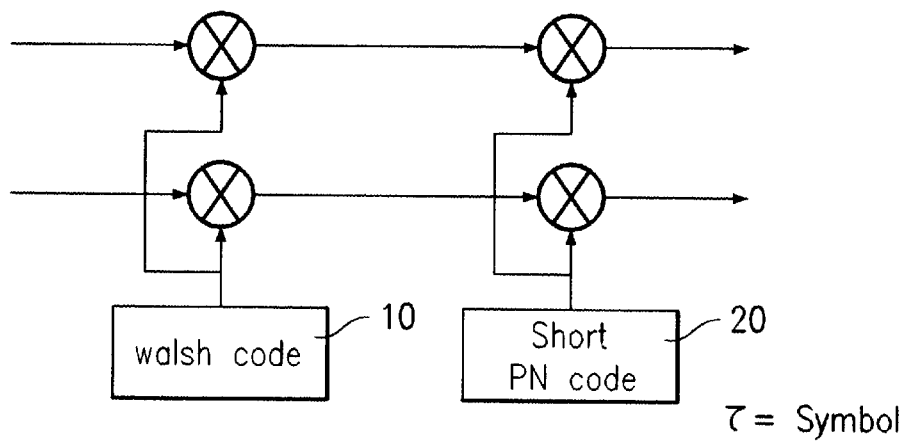
FIG. 2 is a block diagram illustrating a method of allocating optimum Walsh codes to a reverse link in accordance with an embodiment of the present invention.

With reference to FIG. 2, there is illustrated in block diagram a method of allocating optimum Walsh codes to a reverse link in accordance with an embodiment of the present invention. In this embodiment, mobile station signals are distinguished from one another by Walsh codes.

Figure 4:
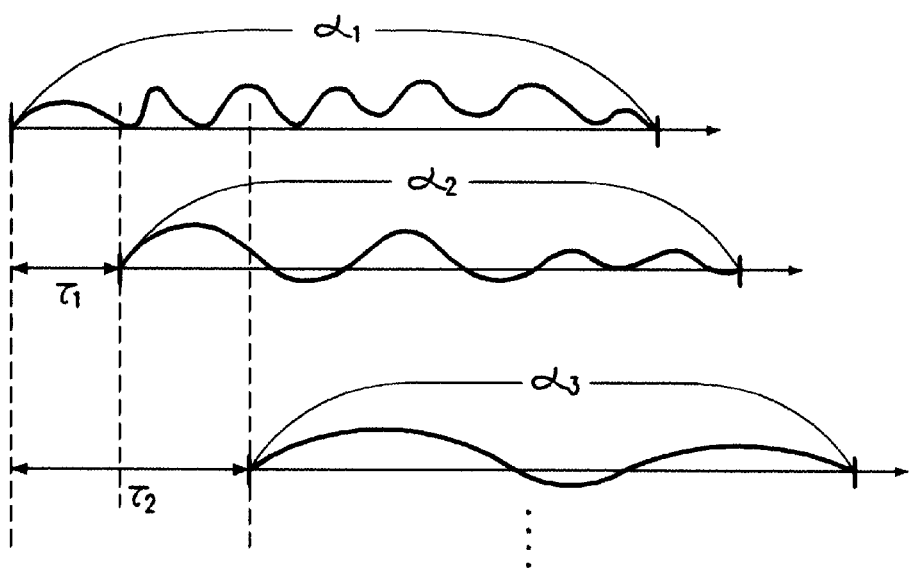
FIG. 4 is a view illustrating signal intensities and delay characteristics of profiles of a multipath in a real reverse link.

In the forward link, profiles of a multipath are the same because mobile station signals are in synchronization on the basis of a reference time. But, in the reverse link, as shown in FIG. 4, mobile station signals through the multipath, received by a base station, are not in synchronization with one another. Even if the received mobile station signals correspond to the same mobile station, they have signal intensities and delay characteristics which are different in each path of the multipath.

Accordingly, the mobile station signals through the multipath of the reverse link must be synchronized for the allocation of optimum Walsh codes to the reverse link in accordance with the present invention.

Then, channels are estimated with respect to all orthogonal function codes of each of the synchronized mobile stations and an optimum orthogonal function code is obtained on the basis of the estimated channel values.

The orthogonal function code can be obtained in the below manner. For example, the orthogonal function code may be a Walsh code, a gold code or any other orthogonal code.

In the present embodiment, the Walsh code is employed as the orthogonal function code. This Walsh code can be obtained from different cost functions depending on the case where each mobile station signal is spread by binary phase shift keying (referred to hereinafter as BPSK spreading) and the case where it is spread by quadrature phase shift keying (referred to hereinafter as QPSK spreading).

First, in the case where each mobile station signal is spread by the BPSK spreading, the optimum orthogonal Walsh code can be obtained as follows.

The optimum orthogonal Walsh code allocated to each mobile station is obtained when the cost function of a signal received from each mobile station is the minimum. The cost function of a signal received from each mobile station can be expressed as follows:

$$P(i) = \sum_{i=1}^{I}\sum_{j=1}^{J}\sum_{m=1}^{K}\sum_{n=1}^{K} \alpha_{i,m}^2 \alpha_{j,n}^2 C_{i,j}^2(\tau_{j,m} - t_{i,n}) \cdot [1 - \delta(i,j)\delta(m,n)]$$ [equation 1]

where, the term $[1-\delta(i,j)\delta(m,n)]$ is appended for subtraction of a signal component, and "$\tau_{i,m}$" indicates a time delay of an mth path of an ith user.

The above equation 1 is used to obtain a noise power of a signal received from each mobile station, in which "$\alpha^2_{i,m}$" and "$\alpha^2_{j,m}$" are estimated channel values indicative of a power intensity of each mobile station. These estimated channel values are previously obtained in the procedure of estimating the channels of each mobile station, and thus they are constants in the above equation 1.

Consequently, the optimum orthogonal Walsh code is obtained on the basis of a correlation function $C_{i,j}$ when the cost function is the minimum.

The correlation function $C_{i,j}$ is defined as follows:

$$C_{ij}(\tau) = \int X_i(t)X_j(t-\tau)d\tau$$ [Equation 2]

In the above correlation function, "$X_1(t)$" is a combination of a Walsh code and a PN code, as defined as follows:

$$X_i(t) = W_i(t)p(t)$$ [Equation 3]

where, "$W_i(t)$" is the Walsh code and "P(t)" is the PN code.

As seen from the above equation 3, the Walsh code $W_i(t)$ can be obtained when the cost function is the minimum. The obtained Walsh code is the optimum orthogonal Walsh code allocated to the ith mobile station.

In the case of the QPSK spreading, the optimum orthogonal Walsh code can be obtained as follows.

The optimum orthogonal Walsh code allocated to each mobile station is obtained when a cost function of a signal received from each mobile station is the minimum. The cost function of a signal received from each mobile station can be expressed as follows:

$$\sum_{i=1}^{I}\sum_{j=1}^{J}\sum_{m=1}^{K}\sum_{n=1}^{K} \alpha_{i,m}^2 \alpha_{j,n}^2 \left[C_{i,j}^{I,I}(\tau_{i,m}-\tau_{j,n}) + C_{i,j}^{Q,Q}(\tau_{i,m}-\tau_{j,n})\right]^2 +$$

$$\left[C_{i,j}^{I,Q}(\tau_{i,m}-\tau_{j,n}) + C_{i,j}^{Q,I}(\tau_{i,m}-\tau_{j,n})\right]^2 [1 - \delta(i,j)\delta(m,n)]$$ [equation 4]

The above equation 4 is used to obtain a noise power of a signal received from each mobile station, in which "$\alpha^2_{i,m}$" and $\alpha_{j,m}$ are estimated channel values indicative of a power intensity of each mobile station. These estimated channel values are previously obtained in the procedure of estimating the channels of each mobile station. Hence, the estimated channel values are constants in the above equation 4.

As a result, the optimum orthogonal Walsh code is obtained on the basis of a correlation function $C_{i,j}$ when the cost function is the minimum. An I-channel correlation function and Q-channel correlation function between the ith mobile station and the jth mobile station can be defined as follows:

$$C_{i,j}^{I,I}(\tau) = \int X_i^I(t)X_j^I(t-\tau)d\tau$$ [equation 5]

$$C_{i,j}^{Q,Q}(\tau) = \int X_i^Q(t)X_j^Q(t-\tau)d\tau$$

$$C_{i,j}^{I,Q}(\tau) = \int X_i^I(t)X_j^Q(t-\tau)d\tau$$

$$C_{i,j}^{Q,I}(\tau) = \int X_i^Q(t)X_j^I(t-\tau)d\tau$$

In the above correlation functions, "$X_i(t)$" is a combination of a Walsh code and a PN code, as defined as follows respectively with respect to I and Q channels:

$$X^I_i(t) \triangleq W_i(t)p_I(t)$$
$$X^Q_i(t) \triangleq W_i(t)p_Q(t)$$

where, "$W_i(t)$" is the Walsh code, "$P_I(t)$" is the PN code of I channel and "$P_Q(t)$" is the PN code of the Q channel. Although the integration time is selected by a system designer, it must preferably be a period of the Walsh code or more. In the BPSK spreading, $P_I(t) = P_Q(t)$.

The above values can more readily be obtained in the case where the ith mobile station signal and the jth mobile station signal are in synchronization with each other at the base station. If the ith mobile station signal and the jth mobile station signal are not in synchronization with each other at the base station, the above correlation function values may be instable due to such an asynchronous state.

As a result, the Walsh code $W_i(t)$ can be obtained when the cost function is the minimum, and the obtained Walsh code is the optimum orthogonal Walsh code allocated to the ith mobile station.

In the above procedure of obtaining the optimum orthogonal Walsh code of each mobile station, the used PN code may be either a long PN code or a short PN code. If the used PN code is a short PN code 20 with a period which is a Walsh code period/integer, the value P(t) is fixed with respect to the value $W_i(t)$. In the present embodiment, for example, a short PN code, which has the same period as one mobile station symbol interval, is used.

The short PN code 20 is used to spread each mobile station signal in order to mitigate the large autocorrelation of Walsh code.

Noticeably, a considerable amount of time is required in calculating the above cost function with respect to all possible Walsh code combinations by the user.

For this reason, in view of the current hardware level, the above cost function is applicable to a condition where the path characteristic of each user is fixed or very slowly varied, such as a wireless local loop (WLL) environment or an indoor environment. Also, the above cost function is applicable to an environment where the calculation time becomes no great issue because of a slow variation of the path characteristic. In other words, the cost function is applicable to an environment where an optimum Walsh code combination is previously calculated and then fixedly used, or an environment where the calculation time is sufficient with a slow variation of the path characteristic.

A suboptimization method is realistically used in a situation where the path characteristic is relatively rapidly varied. This suboptimization method is to optimize only a newly entered user's Walsh code without changing a previously allocated user's code.

The suboptimization method can reduce the calculation time because it minimizes only the sum of interferences resulting from the new user.

In the suboptimization method, the cost function is as follows.

First, in the BPSK spreading, the cost function can be expressed by the following equation:

$$\sum_{j=1}^{I} \sum_{m=1}^{K} \sum_{n=1}^{K} \alpha_{o,m}^2 \alpha_{j,n}^2 C_{o,j}^2 (\tau_{o,m} - \tau_{j,n})[1 - \delta(m, n)]$$

In the QPSK spreading, the cost function can be expressed by the following equation:

$$\sum_{j=1}^{I} \sum_{m=1}^{K} \sum_{n=1}^{K} \alpha_{o,m}^2 \alpha_{j,n}^2 C_{o,j}^2 (\tau_{o,m} - \tau_{j,n})[1 - \delta(m, n)]$$

where, a subscript "O" index indicates a new user.

A Walsh code minimizing the cost function is a suboptimum Walsh code allocated to a new user. After the suboptimum orthogonal Walsh code obtained in the above manner is allocated to the ith mobile station, the above-mentioned operation is repeated with respect to newly entered different mobile stations at an interval of predetermined time to obtain suboptimum orthogonal Walsh codes and allocate them respectively to the corresponding mobile stations.

According to a system operator's selection, the above-mentioned suboptimum Walsh code allocation method can be applied to the initial Walsh code allocation to each mobile station, as well as a new user.

Figure 3:
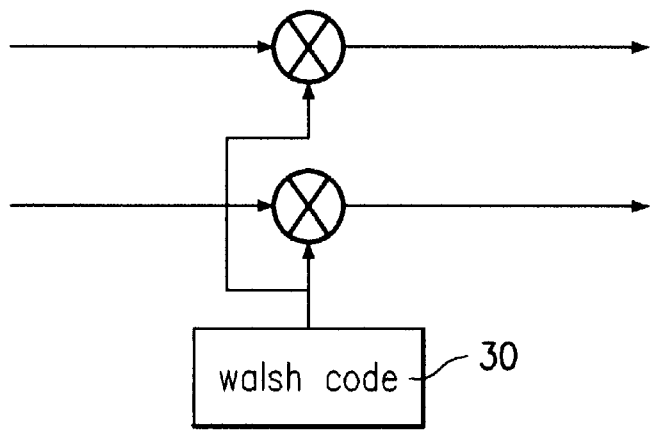
FIG. 3 is a block diagram illustrating a method of allocating optimum Walsh codes to a reverse link in accordance with an alternative embodiment of the present invention.

FIG. 3 is a block diagram illustrating a method of allocating optimum Walsh codes to a reverse link in accordance with an alternative embodiment of the present invention. In a different manner from the first embodiment, in the second embodiment, the PN code spreading is not applied and only the orthogonal Walsh code is allocated for discrimination between mobile stations, as shown in FIG. 3. In the second embodiment, "$X_i(t)$" in the cost function is defined as follows:

$$X_i(t) \triangleq W_i(t)$$

where, "$W_i(t)$" is a Walsh code and "$X_i(t)$" is the Walsh code itself, too.

The second embodiment provides the optimum performance under an environment with a single cell.

Figure 5:
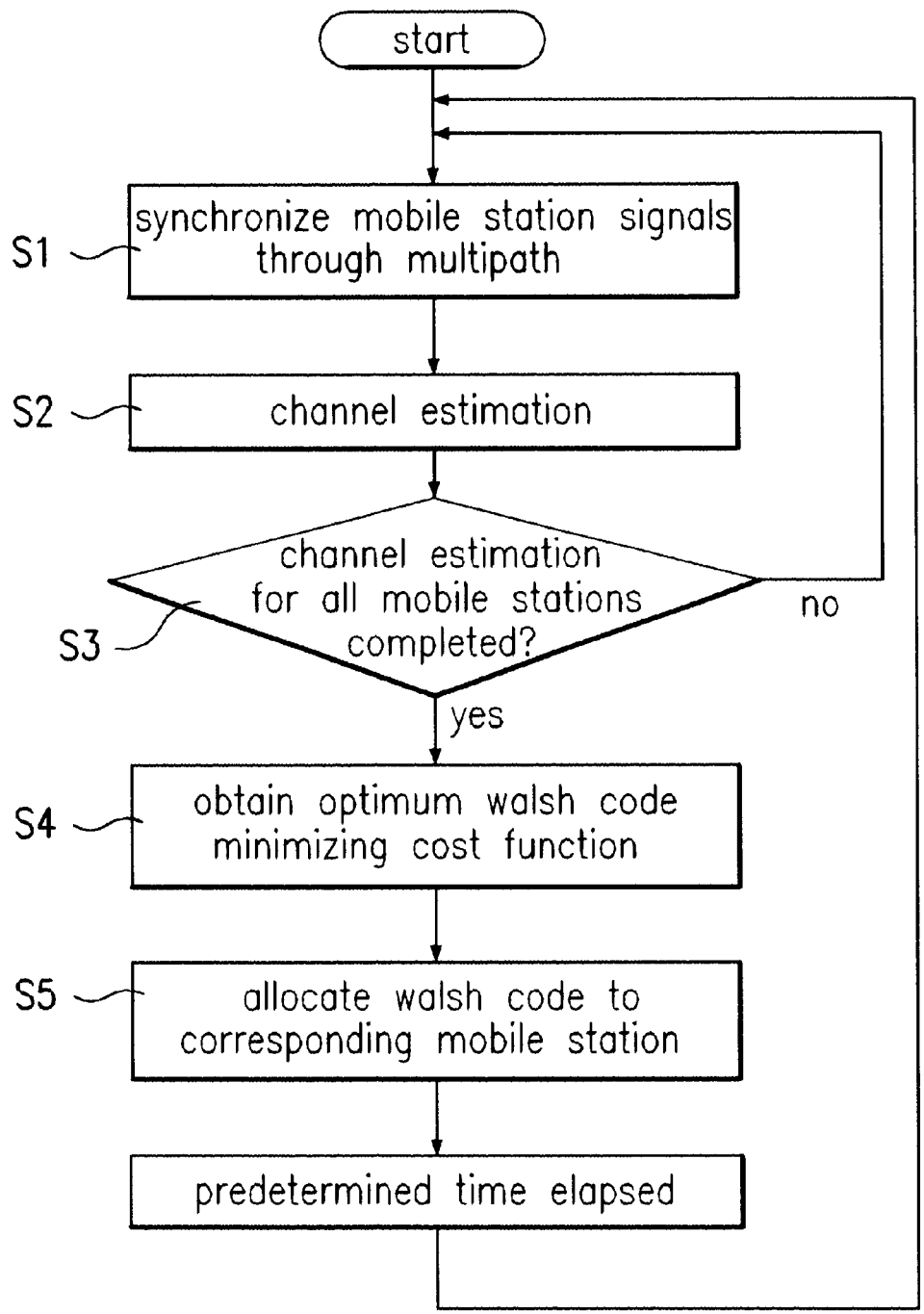
FIG. 5 is a flowchart illustrating the method of allocating the optimum Walsh codes to the reverse link in accordance with the present invention.

FIG. 5 is a flowchart illustrating the method of allocating the optimum Walsh codes to the reverse link in accordance with the present invention.

In the reverse link, each base station must detect the multipath characteristics of mobile stations as shown in FIG. 4 to synchronize signals received from the mobile stations.

As a result, the mobile station signals through the multipath are synchronized at step S1.

Then, channels are estimated with respect to all the mobile stations at step S2. If the channel estimation is completed with respect to all the mobile stations at step S3, an optimum orthogonal Walsh code minimizing a cost function of a desired one of the mobile stations is obtained at step S4.

The obtained optimum orthogonal Walsh code is allocated to the corresponding mobile station at step S5. Then, after a predetermined time elapses, an optimum or suboptimum orthogonal Walsh code is obtained with respect to a different one of the mobile stations. Then, the obtained optimum or suboptimum orthogonal Walsh code is allocated to the corresponding mobile station.

The above steps S1 to S5 are sequentially repeated until orthogonal Walsh codes are allocated to all of the mobile stations. Preferably, the above-mentioned operation is repeated at an interval of 4 sec to enhance a signal-to-noise ratio of the reverse link on the order of 3 dB.

In the case where optimum orthogonal Walsh codes are to be selectively allocated, they may be obtained in the lump from the equation 1 or equation 4.

As apparent from the above description, the reverse link optimum Walsh code allocation method of the present invention has the following effects.

Namely, optimum Walsh codes are allocated respectively to a plurality of mobile stations through the reverse link to minimize an inter-mobile station interference through the multipath. As a result, the signal-to-noise ratio of the reverse link can be enhanced by the order of 3 to 5 dB. Further, the present invention is especially useful in a communication system where channels are slowly varying, such as a wireless local loop, as well as the indoor application in CDMA communication system.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of allocating codes in a communication system, comprising:

(a) detecting characteristics of N communication channels, where N is a positive integer and the N communication channels include at least one active channel having a code allocated thereto;

(b) modeling the N communication channels based on a type of detected modulation of each of a plurality of modulation types used on the N communication channels, the modulation type determining a function used to model the N communication channels, and based on the detected characteristics, wherein more than one combination of the codes corresponding to the respective communication channels is modeled, for every group of N distinct codes, from a set of M potential codes;

(c) selecting a subset of N codes, from the set of M potential codes, based on the modeling results; and (d) assigning each of the selected N codes to a corresponding one of the N communication channels.

2. The method of claim 1, wherein (c) and (d) further comprise:
   determining the expected performance of the modeled communication channels for each combination of N codes;
   selecting a particular combination of N codes, from the set of M codes, that is determined to produce an expected performance meeting a prescribed criterion; and
   assigning each of the particular combination of N codes to the corresponding one of the N communication channels for which the respective code was modeled, when the prescribed criterion was met.

3. The method of claim 2, wherein the prescribed criterion is the minimum sum value of noise determined for the modeled communication channels.

4. The method of claim 2, wherein the modeling accounts for inter-path interference resulting from multipath characteristics of the N communication channels and the modeled multipath characteristics are based on the detected characteristics.

5. The method of claim 4, wherein the prescribed criterion is the minimization of combined inter-path interference.

6. The method of claim 2, wherein the modeling accounts for interference resulting from the N communication channels and the modeled interference is based on the detected characteristics.

7. The method of claim 6, wherein the prescribed criterion is the minimization of combined interference.

8. The method of claim 2, wherein the modeling accounts for propagation effects and interference resulting from the N communication channels and the modeled propagation effects and interference are based on the detected characteristics.

9. The method of claim 8, wherein the prescribed criterion is the maximization of combined signal-to-noise ratio.

10. The method of claim 1, further comprising synchronizing signals communicated within the N communication channels before performing (a) through (d).

11. The method of claim 1, further comprising repeating (a) through (d) on a periodic basis, wherein a current assignment of the codes to the communication channels has no influence on a subsequent selection and assignment of codes to the communication channels and the value of N may change with each repetition of (a) through (d).

12. The method of claim 1, further comprising repeating (a) through (d) when the number of communication channels, N, that are active changes.

13. The method of claim 1, further comprising:
   identifying a modulation type of the N communication channels from the detected characteristics; and
   selecting a model for modeling the N communication channels, based on the identified modulation type.

14. A method of allocating codes in a communication system comprising:
   (a) detecting characteristics of N communication channels, where N is a positive integer and the N communication channels include at least one active channel have a code allocated thereto;
   (b) modeling the N communication channels in accordance with a type of modulation used on the N communication channels based on the detected characteristics, wherein more than one combination of the codes corresponding to the respective communication channels is modeled for every group of N distinct codes, from a set of M potential codes;
   (c) selecting a subset of N codes, from the set of M potential codes, based on the modeling results; and
   (d) assigning each of the selected N codes to a corresponding one of the N communication channels,
   wherein when an additional P channels transition to an active state while N codes are currently allocated to N communication channels currently active, the method further comprises:
   (e) detecting characteristics of N+P communication channels;
   (f) selecting a subset of P codes, from a set of Q potential codes, based on the detected characteristics; and
   (g) assigning each of the P codes to a corresponding one of the P communication channels, wherein the set of Q potential codes comprises the currently unassigned codes.

15. A method of allocating codes in a communication system, comprising:
   (a) detecting characteristics of N communication channels, where N is a positive integer;
   (b) modeling the N communication channels based on the detected characteristics and a detected type of modulation of each of a plurality of modulation types used on the N communication channels, the modulation type determining a function used to model the N communication channels, wherein substantially every combination of N distinct codes, from a set of M potential codes, corresponding to the N communication channels is modeled;
   (c) selecting a subset of N codes, from the set of M potential codes, based on the modeling results; and
   (d) assigning each of the selected N codes to a corresponding one of the N communication channels.

16. The method of claim 15, wherein (c) and (d) further comprise:
   determining the expected performance of the modeled communication channels for each combination of N codes;
   selecting a particular combination of N codes, from the set of M codes, that is determined to produce an expected performance meeting a prescribed criterion; and
   assigning each of the particular combination of N codes to the corresponding one of the N communication channels for which the respective code was modeled, when the prescribed criterion was met.

17. A method of allocating codes in a communication system, comprising:
   (a) detecting characteristics of N communication channels, where N is a positive integer;
   (b) selecting a subset of N codes, from a set of M potential codes, based on the detected characteristics; and
   (c) assigning each of the selected N codes to a corresponding one of the N communication channels; and
   (d) repeating (a) through (c), wherein
      a current assignment of the codes to the communication channels has no influence on a subsequent selection and assignment of codes to the communication channels and the value of N may change with each repetition of (a) through (c), and
      the set of M potential codes comprises both currently assigned and currently unassigned codes.

18. The method of claim 17, wherein (b) and (c) further comprise:
   modeling the N communication channels based on the detected characteristics and a plurality of combinations of each of at least one group of N distinct codes from the set of M potential codes;
   determining the expected performance of the modeled communication channels for each combination of N codes;

selecting a particular combination of N codes, from the set of M codes, that is determined to produce an expected performance meeting a prescribed criterion; and assigning each of the particular combination of N codes to the corresponding one of the N communication channels for which the respective code was modeled, when the prescribed criterion was met.

19. A method of allocating orthogonal function codes to reverse links in a communication system which has one base station and a plurality of mobile stations, comprising:

(a) detecting characteristics of reverse channels from said mobile stations to said base stations;

(b) obtaining an orthogonal function code based on the detected characteristics of said reverse channels and a detected modulation method of each of a plurality of modulation methods of said mobile stations, the detected modulation method determining a function by which the orthogonal function code is obtained; and (c) allocating the obtained orthogonal function code to a desired one of said mobile stations.

20. The method of claim 18, wherein a current allocation of the orthogonal function codes to said mobile stations has no influence on a subsequent allocation of the orthogonal function codes to said mobile stations.

21. A method of allocating optimum orthogonal function codes to reverse links in a communication system which has one base station and a plurality of mobile stations, comprising:

(a) detecting characteristics of reverse channels from said mobile stations to said base station;

(b) obtaining an orthogonal function code based on the detected characteristics of said reverse channels and a detected modulation method of each of a plurality of modulation methods of said mobile stations, the detected modulation method determining a function by which the orthogonal function code is obtained, said orthogonal function code minimizing an inter-path interference resulting from multipath characteristics of a signal of a desired mobile station; and (c) allocating the obtained orthogonal function code to the desired one of said mobile stations.

22. The method of claim 21, wherein a current allocation of the orthogonal function codes to said mobile stations has no influence on a subsequent allocation of the orthogonal function codes to said mobile stations.

23. A method of allocating optimum orthogonal function codes to a reverse link in a communication system which has one base station and a plurality of mobile stations, comprising:

(a) detecting characteristics of reverse channels from said mobile stations to said base station;

(b) obtaining an orthogonal function code based on the detected characteristics of said reverse channels and a detected modulation method of each of a plurality of modulation methods of said mobile stations, the detected modulation method determining a function by which the orthogonal function code is obtained, said orthogonal function code minimizing an interference between a desired mobile station and all other mobile stations; and (c) allocating the obtained orthogonal function code to the desired one of said mobile stations.

24. A method of allocating orthogonal function codes to a reverse link in a communication system which has one base station and a plurality of mobile stations, comprising:

(a) detecting characteristics of reverse channels from said mobile stations to said base station;

(b) obtaining an orthogonal function code based on the detected characteristics of said reverse channels and a modulation method of said mobile stations, said orthogonal function code reducing an interference between a desired mobile station and all other mobile stations; and (c) allocating the obtained orthogonal function code to the desired one of said mobile stations, wherein said step (b) include applying a sub-optimization method if said detected characteristics of reverse channels are relatively rapidly varied.

25. The method of claim 23, wherein a current allocation of the orthogonal function codes to said mobile stations has no influence on a subsequent allocation of the orthogonal function codes to said mobile stations.

26. The method of claim 24, wherein said sub-optimization method optimizes only a newly entered user's Walsh code without changing a previously allocated user's code.

27. The method of claim 24, wherein said modulation method of said mobile stations is Quadrature Phase Shift Keying (QPSK) or Binary Phase Shift Keying (BPSK).

28. A method of allocating codes in a communication system, comprising:

(a) detecting characteristics of N communication channels;

(b) identifying a modulation type of the N communication channels for the detected characteristics;

(c) selecting a model for modeling the N communication channels, based on the identified modulation type;

(d) modeling the N communication channels based on the selected model, wherein more than one combination of the codes corresponding to the respective N communication channels is modeled for every group of N distinct codes, from a set of M potential codes, wherein the set of M potential codes include both currently assigned and currently unassigned codes;

(e) selecting a subset of the N codes, from the set of M potential codes, based on the modeling results; and (f) assigning the selected subset of the N codes to a corresponding one of the N communication channels.

29. The method of claim 28, wherein identifying a modulation type of the N communication channels for the detected characteristics comprises identifying a modulation type of each of a plurality of modulation types used on the N communication channels for the detected characteristics.

30. The method of claim 29, wherein the modeling comprises obtaining orthogonal function codes based on the detected characteristics of the N channels of a reverse link in the communication system, wherein the obtaining the orthogonal function codes includes applying a sub-optimization method if said characteristics of the reverse link are relatively rapidly varied.

* * * * *